(12) United States Patent
Murakami et al.

(10) Patent No.: US 8,261,360 B2
(45) Date of Patent: Sep. 4, 2012

(54) CONTENT DISTRIBUTING SYSTEM WITH DYNAMIC ENCRYPTION KEYS

(75) Inventors: Miki Murakami, Tokyo (JP); Kenichi Tsuchiya, Kanagawa (JP)

(73) Assignee: Sony Corporation, Tokyo (JP)

( * ) Notice: Subject to any disclaimer, the term of this patent is extended or adjusted under 35 U.S.C. 154(b) by 1173 days.

(21) Appl. No.: 11/059,419

(22) Filed: Feb. 17, 2005

(65) Prior Publication Data

US 2005/0216413 A1 Sep. 29, 2005

(30) Foreign Application Priority Data

Mar. 29, 2004 (JP) ................................ 2004-095273

(51) Int. Cl.
G06F 7/04 (2006.01)
G06F 21/00 (2006.01)

(52) U.S. Cl. ............................... 726/27; 726/26; 705/51
(58) Field of Classification Search .............. 726/26–27; 705/51

See application file for complete search history.

(56) References Cited

U.S. PATENT DOCUMENTS

| | | | |
|---|---|---|---|
| 7,092,527 B2* | 8/2006 | Foster et al. .................. | 380/277 |
| 7,127,431 B2* | 10/2006 | Kambayashi et al. .......... | 705/57 |
| 7,290,285 B2* | 10/2007 | McCurdy et al. ............... | 726/27 |
| 7,340,055 B2* | 3/2008 | Hori et al. ...................... | 380/201 |
| 7,353,541 B1* | 4/2008 | Ishibashi et al. ................ | 726/26 |
| 7,389,272 B2* | 6/2008 | Kambayashi et al. .......... | 705/59 |
| 2002/0035697 A1* | 3/2002 | McCurdy et al. ............. | 713/200 |
| 2002/0085722 A1* | 7/2002 | Asano et al. ................... | 380/278 |
| 2002/0114466 A1* | 8/2002 | Tanaka et al. ................. | 380/232 |
| 2002/0169971 A1* | 11/2002 | Asano et al. ................... | 713/193 |
| 2002/0184515 A1* | 12/2002 | Oho et al. ...................... | 713/193 |
| 2003/0050894 A1* | 3/2003 | Kambayashi et al. .......... | 705/57 |
| 2003/0051151 A1* | 3/2003 | Asano et al. ................... | 713/193 |
| 2003/0079042 A1* | 4/2003 | Yamanaka et al. ............. | 709/247 |
| 2003/0191954 A1* | 10/2003 | Kambayashi et al. ......... | 713/189 |
| 2003/0233559 A1* | 12/2003 | Asano et al. ................... | 713/189 |
| 2004/0030656 A1* | 2/2004 | Kambayashi et al. .......... | 705/59 |
| 2004/0103011 A1* | 5/2004 | Hatano et al. ...................... | 705/4 |
| 2004/0151320 A1* | 8/2004 | Hitachi et al. ................. | 380/277 |
| 2006/0185022 A1* | 8/2006 | Yamanaka et al. .............. | 726/30 |
| 2006/0253400 A1* | 11/2006 | Okamoto et al. ............... | 705/57 |
| 2007/0079380 A1* | 4/2007 | Kawaguchi et al. ............ | 726/26 |
| 2007/0094505 A1* | 4/2007 | Futa et al. ...................... | 713/176 |
| 2007/0276760 A1* | 11/2007 | Kanehara et al. ............... | 705/59 |
| 2008/0154633 A1* | 6/2008 | Ishibashi et al. .................. | 705/1 |

FOREIGN PATENT DOCUMENTS

JP 8-212198 8/1996
JP 10-271104 10/1998
(Continued)

OTHER PUBLICATIONS

Chong et al., "Security Attributes Based Digital Rights Management," 2002, Springer-Verlag Berlin Heidelberg, pp. 339-352.*
Perkins et al., "An Encryption Scheme for Limited k-time Access to Digital Media," Jan. 2003, IEEE, pp. 171-177.*
Hanaoka et al., "Separating Encryption and Key Issuance in Digital Rights Management System," 2003, Springer-Verlag Berlin Heidelberg, pp. 365-376.*

*Primary Examiner* — Luu Pham (74) *Attorney, Agent, or Firm* — Oblon, Spivak, McClelland, Maier & Neustadt, L.L.P.

(57) ABSTRACT

A content distributing system for distributing content disclosed herein is an encrypting apparatus for encrypting each of objects constituting content using a different encryption key, a content offering apparatus for offering the encrypted content to a content reproducing apparatus; a license information offering apparatus for offering license information including information necessary for decrypting the encrypted content, and a content reproducing apparatus for acquiring the encrypted content from the content offering apparatus in order to decrypt and reproduce the acquired content using the license information acquired from the license offering apparatus.

29 Claims, 6 Drawing Sheets

FOREIGN PATENT DOCUMENTS

| | | |
|---|---|---|
| JP | 2001-195369 | 7/2001 |
| JP | 2001-211148 | 8/2001 |
| JP | 2003-115830 | 4/2003 |
| JP | 2003-141816 | 5/2003 |

* cited by examiner

CONTENT DISTRIBUTING SYSTEM WITH DYNAMIC ENCRYPTION KEYS

BACKGROUND OF THE INVENTION

The present invention relates to a content distributing system, an encrypting apparatus, a content offering apparatus, a content reproducing apparatus, a license information offering apparatus, an encrypting method, a content offering method, a content reproducing method, a license information offering method, an information processing program, and a storage medium. More particularly, the invention relates to techniques for reinforcing the capability of concealing content by dynamically generating an encryption key for each of the objects constituting the content.

In recent years, varieties of digital content have been distributed in growing quantities over the Internet. Digital content (simply called content hereunder) is constituted illustratively by text information, still pictures, moving pictures, video games, and other publications converted into electronic data. As such, content is reproduced by personal computers or by dedicated reproducing apparatuses for use.

Content is delivered to users illustratively over networks. In today's electronized society, this mode of content delivery poses a big challenge: how to let legitimate users alone make use of content and to keep unauthorized users from illicitly uses in order to protect copyrights.

Conventional methods for enabling the legitimate user to use content typically involve encrypting content using a common key while allowing the user to acquire this common key so that the authorized user alone can decrypt the content using the acquired key. One such method is disclosed illustratively in Japanese Patent Laid-open No. 2002-359616.

The disclosed technique requires clients to acquire licenses in order to reproduce content. A header attached to content is arranged to include information for specifying a relevant license. Only if a client is in possession of the license specified by the information is it possible for the client to decrypt and reproduce the content in question.

Conventionally, all objects included in content were encrypted using the same encryption key. Once the encryption key was identified, it was possible to decrypt all objects. For example, even if a block chaining scheme such as CBC mode of DES (Data Encryption Standard) is utilized, once an initial vector and a common key are identified, all data can eventually be decrypted. Block chaining is a method that involves encrypting the first block, then utilizing an outcome of the encryption of the first block in order to encrypt the next block, and repeating the encrypting process in chained fashion.

Preparing a large number of encryption keys in advance could conceivably boost the capability of data concealment. This measure, however, has the disadvantage of increasing content and key sizes because of the numerous keys to be prepared for encryption.

It is therefore an object of the present invention to provide an encrypting apparatus and a reproducing apparatus, as well as related methods and other resources for encrypting content in a manner enhancing the level of content concealment while allowing the encrypted content to be decrypted efficiently.

SUMMARY OF THE INVENTION

In carrying out the invention and according to one aspect thereof, there is provided (as a first structure) a content distributing system for distributing content, including: an encrypting apparatus for encrypting each of objects constituting content using a different encryption key; a content offering apparatus for offering the encrypted content to a content reproducing apparatus; a license information offering apparatus for offering license information including information necessary for decrypting the encrypted content; and a content reproducing apparatus for acquiring the encrypted content from the content offering apparatus in order to decrypt and reproduce the acquired content using the license information acquired from the license offering apparatus.

According to another aspect of the invention, there is provided (as a second structure) an encrypting apparatus including: a content acquiring unit for acquiring content; an encrypting unit for encrypting the acquired content in units of each of objects constituting the content using a different encryption key; and an outputting unit for outputting the encrypted content.

Preferably (as a third structure), the encrypting apparatus of the second structure may further include an encryption key generating unit for generating the encryption key by operating, for each of the objects, on key generation information included in each object and on predetermined initial information; wherein the encrypting unit may encrypt each of the objects using the generated encryption key.

Preferably (as a fourth structure), the encrypting apparatus of the third structure may further include an initial information processing unit for encrypting the initial information in a manner decryptable by use of license information before incorporating the encrypted initial information into the encrypted content.

Preferably (as a fifth structure), the encrypting apparatus of the third structure may further include an establishing unit for establishing an encryption key generating method for determining the number of the encryption keys; wherein the encryption key generating unit may generate the encryption keys using the established encryption key generating method.

Preferably (as a sixth structure), in the encrypting apparatus of the second structure, the encrypting unit may incorporate encryption key generating method information representing an encryption key generating method into the encrypted content.

According to a further aspect of the invention, there is provided (as a seventh structure) a content offering apparatus including: an accepting unit for accepting a content offering request; and a content offering unit for offering content in response to the accepted request; wherein the content is made up of objects each encrypted by a different encryption key.

Preferably (as an eighth structure), in the content offering apparatus of the seventh structure, the encryption key may be generated by operating on key generation information included in each of the objects and on predetermined initial information.

Preferably (as a ninth structure), in the content offering apparatus of the eighth structure, the content may include the initial information encrypted in a manner decryptable from the content by use of license information.

Preferably (as a tenth structure), in the content offering apparatus of the seventh structure, the content may include encryption key generating method information representing an encryption key generating method for generating the encryption keys.

According to an even further aspect of the invention, there is provided (as an eleventh structure) a content reproducing apparatus including: a content acquiring unit for acquiring content encrypted in units of each of objects constituting the content by use of a different encryption key; a decrypting unit for decrypting the objects constituting the content; and a content reproducing unit for reproducing the decrypted content.

Preferably (as a twelfth structure), in the content reproducing apparatus of the eleventh structure, the decrypting unit may generate the encryption key by operating on key generation information included in each of the objects and on predetermined initial information, in order to decrypt each of the objects using the generated encryption key.

Preferably (as a thirteenth structure), in the content reproducing apparatus of the twelfth structure, the initial information may be included in the content in encrypted form; and the content reproducing apparatus may further include: a license information acquiring unit for acquiring license information corresponding to the acquired content; and an initial information acquiring unit for acquiring the initial information from the content by decrypting the initial information using the acquired license information; wherein the decrypting unit may generate the encryption key using the acquired initial information.

Preferably (as a fourteenth structure), the content reproducing apparatus of the twelfth structure may further include an encryption key generating method information verifying unit for verifying encryption key generating method information which is acquired from the acquired content and which represents an encryption key generating method for generating the encryption key; wherein the decrypting unit may select an operating method for generating the encryption key by use of the verified encryption key generating method information.

According to a still further aspect of the invention, there is provided (as a fifteenth structure) a license information offering apparatus for offering license information by which to acquire initial information from content encrypted in units of each of objects constituting the content by use of a different encryption key, the initial information being used to generate the encryption key.

According to a yet further aspect of the invention, there is provided (as a sixteenth structure) an encrypting method for use with a computer having a content acquiring unit, an encrypting unit, and an outputting unit, the encrypting method including the steps of: causing the content acquiring unit to acquire content; causing the encrypting unit to encrypt the acquired content in units of each of objects constituting the content by use of a different encryption key; and causing the outputting unit to output the encrypted content.

Preferably (as a seventeenth structure), with the encrypting method of the sixteenth structure, the computer may further include an encryption key generating unit; and the encrypting method may further include the step of causing the encryption key generating unit to generate the encryption key by operating on key generation information included in each of the objects and on predetermined initial information; wherein the encrypting step may encrypt each of the objects using the generated encryption key.

Preferably (as an eighteenth structure), with the encrypting method of the seventeenth structure, the computer may further include an initial information processing unit; and the encrypting method may further include the step of causing the initial information processing unit to encrypt the initial information in a manner decryptable by use of license information and to incorporate the encrypted initial information into the encrypted content.

Preferably (as a nineteenth structure), with the encrypting method of the seventeenth structure, the computer may further include an encryption key generating method establishing unit; and the encrypting method may further include the step of causing the encryption key generating method establishing unit to establish an encryption key generating method; wherein the encryption key generating step may generate the encryption key by use of the established encryption key generating method.

Preferably (as a twentieth structure), with the encrypting method of the sixteenth structure, the encrypting step may incorporate encryption key generating method information representing an encryption key generating method into the encrypted content.

According to another aspect of the invention, there is provided (as a twenty-first structure) a content offering method for use with a computer having an accepting unit and a content offering unit, the content offering method including the steps of: causing the accepting unit to accept a content offering request; and causing the content offering unit to offer content in response to the accepted request; wherein the content is made up of objects each encrypted by a different encryption key.

Preferably (as a twenty-second structure), with the content offering method of the twenty-first structure, the encryption key may be generated by operating on key generation information included in each of the objects and on predetermined initial information.

Preferably (as a twenty-third structure), with the content offering method of the twenty-second structure, the content may include the initial information encrypted in a manner decryptable from the content by use of license information.

Preferably (as a twenty-fourth structure), with the content offering method of the twenty-first structure, the content may include encryption key generating method information representing an encryption key generating method for generating the encryption keys.

According to a further aspect of the invention, there is provided (as a twenty-fifth structure) a content offering method for use with a computer having a content acquiring unit, a decrypting unit, and a content reproducing unit, the content offering method including the steps of: causing the content acquiring unit to acquire content encrypted in units of each of objects constituting the content by use of a different encryption key; causing the decrypting unit to decrypt the objects constituting the content; and causing the content reproducing unit to reproduce the decrypted content.

Preferably (as a twenty-sixth structure), with the content reproducing method of the twenty-fifth structure, the decrypting step may generate the encryption key by operating on key generation information included in each of the objects and on predetermined initial information, in order to decrypt each of the objects using the generated encryption key.

Preferably (as a twenty-seventh structure), with the content reproducing method of the twenty-sixth structure, the computer may further include a license information acquiring unit and an initial information acquiring unit, the initial information being included in the content in encrypted form; and the content reproducing method may further include the steps of: causing the license information acquiring unit to acquire license information corresponding to the content acquired by the content acquiring unit; and causing the initial information acquiring unit to acquire the initial information from the content by decrypting the initial information using the acquired license information; wherein the decrypting step may generate the encryption key using the acquired initial information.

Preferably (as a twenty-eighth structure), with the content reproducing method of the twenty-sixth structure, the computer may further include an encryption key generating method information verifying unit; and the content reproducing method may further include the step of causing the encryption key generating method information verifying unit to verify encryption key generating method information which is acquired from the acquired content and which represents an encryption key generating method for generating the encryption key; wherein the decrypting step may select an operating method for generating the encryption key by use of the verified encryption key generating method information.

According to an even further aspect of the invention, there is provided (as a twenty-ninth structure) a license information offering method for use with a computer having a license information offering unit, the license information offering method including the step of causing the license information offering unit to offer license information by which to acquire initial information from content encrypted in units of each of objects constituting the content by use of a different encryption key, the initial information being used to generate the encryption key.

According to a still further aspect of the invention, there is provided (as a thirtieth structure) an information processing program for causing a computer to implement functions of: acquiring content; encrypting the acquired content in units of each of objects constituting the content by use of a different encryption key; and outputting the encrypted content.

Preferably (as a thirty-first structure), the information processing program of the thirtieth structure may further cause the computer to implement a function of generating the encryption key by operating on key generation information included in each of the objects and on predetermined initial information; wherein the encrypting function may encrypt each of the objects using the generated encryption key.

Preferably (as a thirty-second structure), the information processing program of the thirty-first structure may further cause the computer to implement a function of encrypting the initial information in a manner decryptable by use of license information, before incorporating the encrypted initial information into the encrypted content.

Preferably (as a thirty-third structure), the information processing program of the thirty-first structure may further cause the computer to implement a function of establishing an encryption key generating method; wherein the encryption key generating function may generate the encryption key by use of the established encryption key generating method.

Preferably (as a thirty-fourth structure), with the information processing program of the thirtieth structure, the encrypting function may incorporate encryption key generating method information representing an encryption key generating method into the encrypted content.

According to a yet further aspect of the invention, there is provided (as a thirty-fifth structure) an information processing program for causing a computer to implement functions of: accepting a request for offering of content encrypted in units of each of objects constituting the content by use of a different encryption key; and offering the content in response to the accepted request.

Preferably (as a thirty-sixth structure), with the information processing program of the thirty-fifth structure, the encryption key may be generated by operating on key generation information included in each of the objects and on predetermined initial information.

Preferably (as a thirty-seventh structure), with the information processing program of the thirty-sixth structure, the content may include the initial information encrypted in a manner decryptable from the content by use of license information.

Preferably (as a thirty-eighth structure), with the information processing program thirty-fifth structure, the content may include encryption key generating method information representing an encryption key generating method for generating the encryption keys.

According to another aspect of the invention, there is provided (as a thirty-ninth structure) an information processing program for causing a computer to implement functions of: acquiring content encrypted in units of each of objects constituting the content by use of a different encryption key; decrypting the objects constituting the content; and reproducing the decrypted content.

Preferably (as a fortieth structure), with the information processing program of the thirty-ninth structure, the decrypting function may generate the encryption key by operating on key generation information included in each of the objects and on predetermined initial information, in order to decrypt each of the objects using the generated encryption key.

Preferably (as a forty-first structure), with the information processing program of the fortieth structure, the initial information may be included in the content in encrypted form; and the information processing program may further cause the computer to implement functions of: acquiring license information corresponding to the acquired content; and acquiring the initial information from the content by decrypting the initial information using the acquired license information; wherein the decrypting function may generate the encryption key using the acquired initial information.

Preferably (as a forty-second structure), the information processing program of the fortieth structure may further cause the computer to implement a function of verifying encryption key generating method information which is acquired from the acquired content and which represents an encryption key generating method for generating the encryption key; wherein the decrypting function may select an operating method for generating the encryption key by use of the verified encryption key generating method information.

According to a further aspect of the invention, there is provided (as a forty-third structure) an information processing program for causing a computer to implement a function of offering license information by which to acquire initial information from content encrypted in units of each of objects constituting the content by use of a different encryption key, the initial information being used to generate the encryption key.

According to an even further aspect of the invention, there is provided a storage medium which stores an information processing program according to any one of the thirtieth structure through the forty-third structure in a manner readable by a computer.

According to the invention, as outlined above, content can be encrypted in units of each of the objects constituting the content by use of a different encryption key.

Other objects, features and advantages of the invention will become more apparent upon a reading of the following description and appended drawings.

DETAILED DESCRIPTION OF THE PREFERRED EMBODIMENTS

Overview of One Preferred Embodiment

One preferred embodiment of this invention involves a content encrypting method based on a common key encryption system. The method is characterized notably in that it utilizes not one but a plurality of encryption keys to encrypt content for enhanced secrecy. Another characteristic of the method is that the encryption keys are dynamically generated so that the key size will not become too large. Furthermore, the number of encryption keys is controlled so as to strike a suitable balance between the level of concealment achieved by the generated keys on the one hand, and processing loads to be incurred on the client (i.e., reproducing apparatus) using the keys during content reproduction on the other hand.

More specifically, each of the objects making up content is encrypted by use of a different encryption key (common key). Even if the encryption key for one object has been identified and the object data thereby decrypted illicitly, the encryption keys for the remaining objects remain unidentified and the data in the objects are concealed. It is thus difficult to decrypt illegally all objects at once.

Each of the objects may be assigned a different encryption key. Alternatively, the objects may be categorized into groups illustratively by type so that each of the object groups may be assigned an individual encryption key. In the latter case, the groups of the objects use the overlapping encryption key each. In any case, content is divided into portions that are each encrypted using a different encryption key.

On the one hand, if each of the objects making up content is encrypted using a different encryption key, the content is better concealed but imposes more loads on the reproducing apparatus during reproduction because of the dynamic generation of the encryption keys involved. On the other hand, if the objects are put into groups that use an overlapping encryption key each, the content is less well concealed but imposes less loads on the reproducing apparatus during reproduction (because one encryption key generated initially is used for all objects in a group sharing the same key). Between these two cases, this embodiment enables a proper balance to be attained when content is to be encrypted, with the number of encryption keys determined as a result of that balancing act (the encryption keys when overlapping are counted as a single key).

In addition, this embodiment dynamically generates encryption keys based on a single initial content key Kc and on key generation data set for each of the objects constituting content. The key generation data may be information attached to each object such as an object ID or an object type. Alternatively, key generation data may be separately created and embedded in each object. When encryption keys are generated in such a dynamic manner, the key size will not become too big for the content made up of a large number of objects.

The content key Kc is encrypted in a manner decryptable by use of rights information called a license before being embedded into encrypted content. Later, a user acquires the relevant license and thereby retrieves the content key Kc from the encrypted content. Once the content key Kc is obtained, an encryption key is generated from key generation data and the content key Kc. The encryption key is then used to decrypt the corresponding object for reproduction.

Content and its license may be distributed separately in what is known as a superdistribution system. This scheme is designed to help improve the ease and security of content distribution.

As outlined above, an encryption key for each of the objects making up content is dynamically generated using key generation data contained in the object in question. With the encryption key thus changed for each object, it is possible to make abusive decryption of the content all but impossible. Where priority is on the performance of the reproducing apparatus (i.e., on the efficiency of decryption), the number of encryption keys is reduced and the number of objects per encryption key is increased so as to alleviate the burdens on the apparatus during reproduction.

Details of the Preferred Embodiment

This embodiment handles content (content data) constituted by a plurality of objects. Each of the objects is a set of data making up a unit of the content formed by the objects. For example, if content is a book, text data of each of its pages may be turned into an object, and the data making up illustrations in the book may also be turned into objects. Putting together these objects constitutes the original book.

Figure 1:
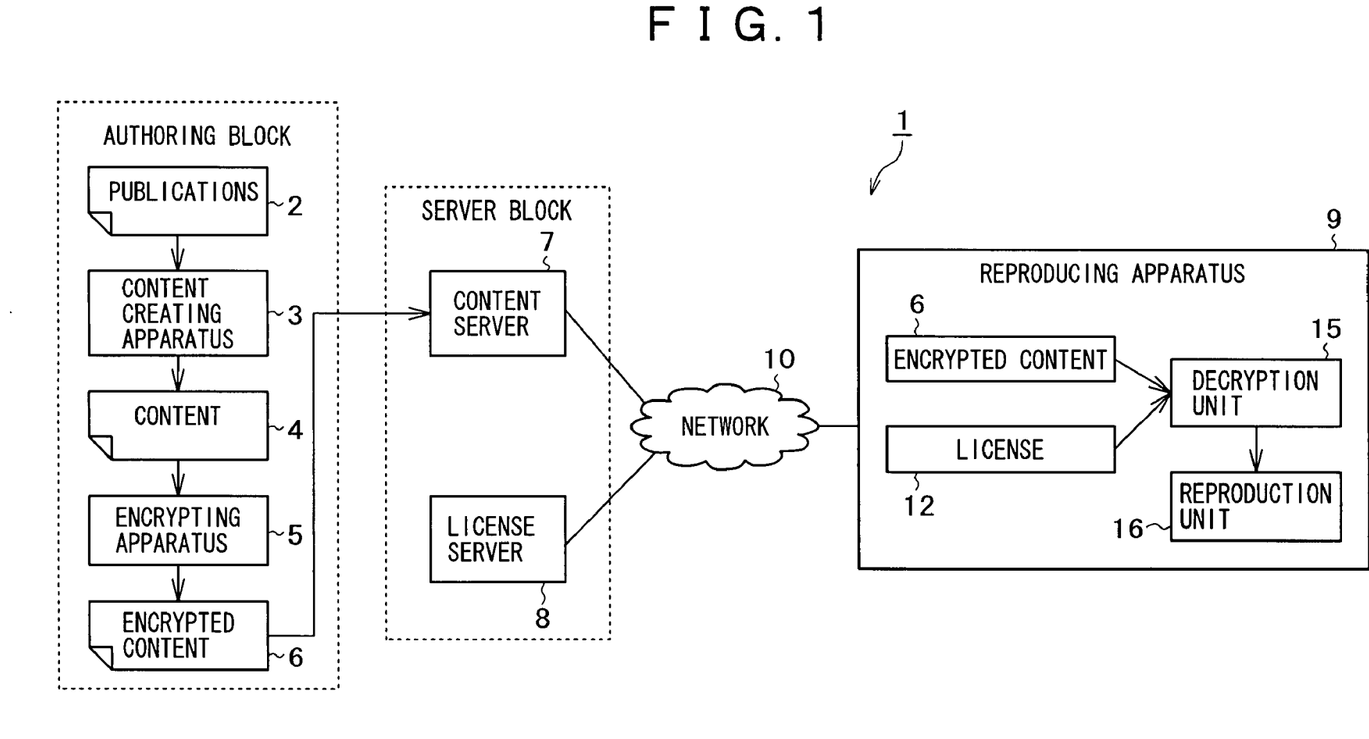
FIG. 1 is a block diagram showing a typical structure of a content distribution system embodying this invention.

FIG. 1 is a block diagram showing a typical structure of a content distribution system 1 embodying this invention. The content distribution system 1 is designed to distribute data over a network 10. The system 1 is composed of three blocks: an authoring block that creates encrypted content upstream, a server block that offers encrypted content and licenses midstream, and a reproducing apparatus 9 (acting as a client) that reproduces content downstream for use by the user.

The authoring block is made up of a content creating apparatus 3 and an encrypting apparatus 5. The content creating apparatus 3 creates content 4 by turning publications 2 into digital form. The encrypting apparatus 5 generates encrypted content 6 by encrypting the content 4.

The content 4 may be exchanged in diverse ways. In one setup, the content creating apparatus 3 and encrypting apparatus 5 may be connected via a network and the content 4 may be forward from one apparatus to the other over the network. In another setup, the content creating apparatus 3 may write the content to a storage medium which is then brought to and read by the encrypting apparatus 5 for content retrieval.

This embodiment utilizes a common key encryption system for its content encryption algorithm. Whereas there are a number of common key encryption systems such as DES and AES (Advanced Encryption Standard), any algorithm will do.

The server block includes a content server 7 (content offering apparatus) and a license server 8 (license information offering apparatus). The content server 7 delivers encrypted content 6 to the reproducing apparatus 9, and the license server 8 distributes license information necessary for using the encrypted content 6.

The content server 7 is a server apparatus that distributes the encrypted content 6. As such, the content server 7 stores inside a plurality of encrypted content items 6, offered by the encrypting apparatus 5. The encrypted content 6 may be sent from the encrypting apparatus 5 to the content server 7 over the network that connects the two apparatuses. Alternatively, the encrypting apparatus 5 may write the encrypted content 6 to a storage medium which is then read by the content server 7 for content retrieval.

The content server 7 runs a content distribution site on the network 10. Users may access the site and select desired content to be downloaded therefrom. When purchasing content, a user gets the reproducing apparatus 9 to transmit the user's own secret information (e.g., password) to the content server 7 for user authentication. After the successful authentication, the content server 7 sends the encrypted content 6 to the user's reproducing apparatus 9 and charges the user for the content that has been purchased.

Alternatively, an authentication server may be set up separately to carry out user authentication, with the content server 7 obtaining the result of authentication from the authentication server. The license server 8, not the content server 7, may charge the user for the purchased content. That is, the content server 7 has two units: one for accepting users' requests to provide content, and the other for offering content in response to the accepted requests.

A license 12 is a license issued by a server and necessary for decrypting the encrypted content 6. The server issuing the license 12 is connected to the network 10, and given a license issuing request from the reproducing apparatus 9, issues the corresponding license 12.

The reproducing apparatus 9 is a terminal that makes use of the content 4. The reproducing apparatus 9 is installed in a manner connectable to the network 10. Although FIG. 1 shows only one reproducing apparatus 9, a plurality of reproducing apparatuses 9 may be configured. A user gains access to the content distribution site of the content server 7 and downloads content (encrypted content 6) from the site. The user also downloads from the license server 8 the license 12 necessary for decrypting the content.

The reproducing apparatus 9 has a decryption unit 15 and a reproduction unit 16. The user can operate the decryption unit 15 to decrypt the content 4 from the encrypted content 6. The user may then have the decrypted content 4 reproduced by the reproduction unit 16.

The network 10 is illustratively constituted by the Internet. Alternatively, the network 10 may be a WAN (wide area network), a LAN (local area network), communication channels set up via satellite links, a telephone line network, an optical cable network, or some other suitable network.

The components making up the content distribution system 1 will now be discussed in more detail. The publications 2 constitute original information making up the content 4. Illustratively, the publications 2 are composed of such data as book data, still picture data, moving picture data, and audio data. It is assumed that publications in paper form and analog data are all turned into digital data beforehand.

The content creating apparatus 3 is an apparatus that creates content by authoring publication data in unencrypted form. The authoring process turns the publication data into objects which are then processed into content. With this embodiment, each set of content is made up of a plurality of objects.

Figure 2:
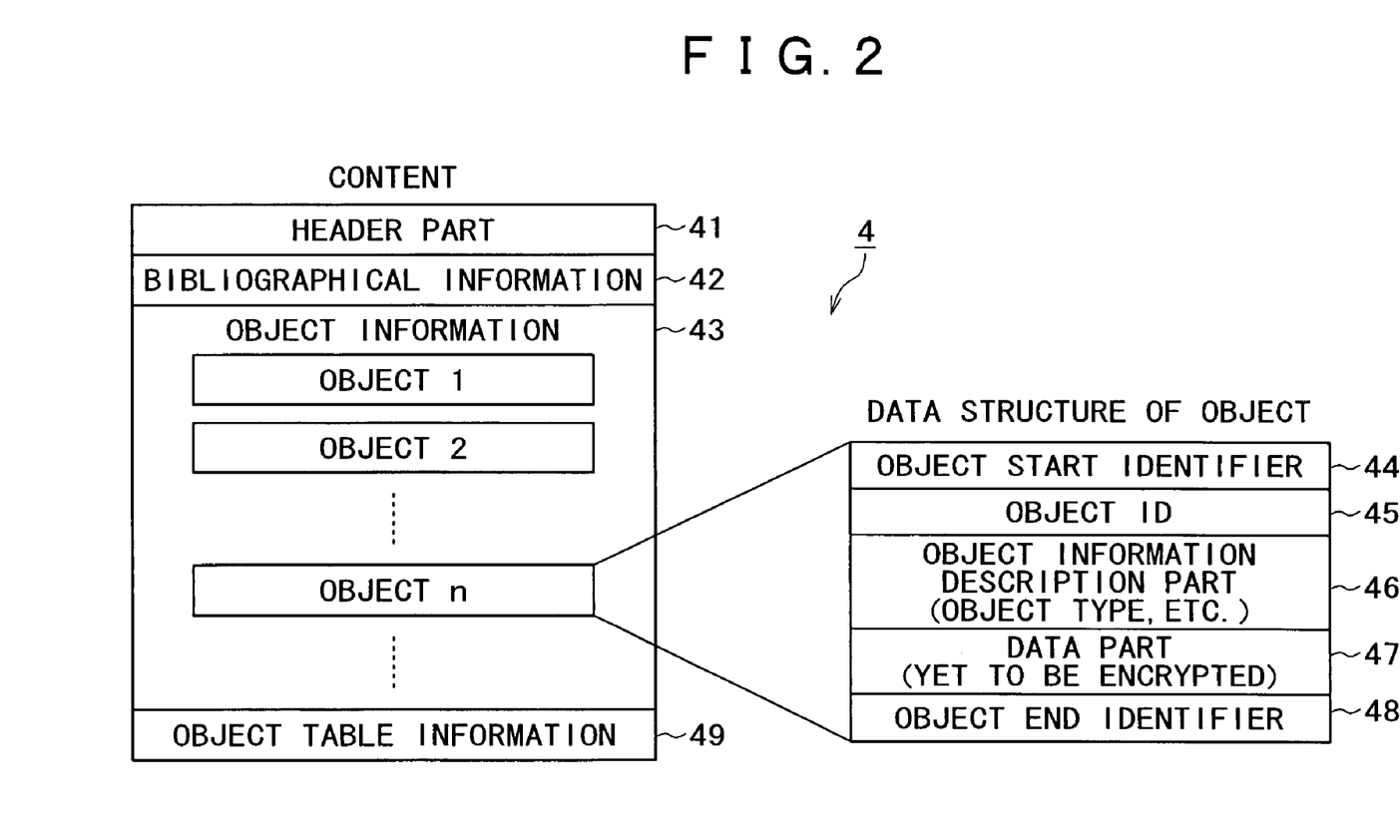
FIG. 2 is an explanatory view depicting a typical content structure.

A typical structure of the content 4 created by the content creating apparatus 3 is explained below with reference to FIG. 2. The content 4 is made up of a header part 41, bibliographical information 42, object information 43, and object table information 49. The header part 41 contains format-related information such as a version number and creation information. A content ID constituting ID information about the content 4 may also be described in the header part 41.

The bibliographical information 42 includes information associated with the content 4 such as a title and an author's name. The object information 43 contains publication data that has been processed and described in a plurality of objects (1, 2, . . . , n). The object table information 49 constitutes a table that indicates where each of the objects is located within the content 4.

Each object is made up of an object start identifier 44, an object ID 45, an object information description part 46, a data part 47, and an object end identifier 48. The object start identifier 44 is information for identifying the starting position of the object in question. The object ID 45 is a unique value attached individually to each object within the content 4. The object information description part 46 describes values representative of an object type (e.g., text data, audio data) and other attributes.

The data part 47 contains unencrypted data that constitutes publication data. In the case of a book, its data is composed of cover data, basic information data about the publication, and text data making up each of the pages. These data components are subject to encryption. The object end identifier 48 is information for identifying the ending position of an object.

The encrypting apparatus 5 (FIG. 1) operates on a content key Kc (initial information) and on key generation data (key generation information) established for each object in order to generate an object key Kobj. Using the object key Kobj thus generated, the encrypting apparatus 5 encrypts each object. That is, the object key Kobj is an encryption key calculated by associating the content key Kc with information included in each object.

The content key Kc is a single set of key information assigned to each content. This key constitutes the initial information that is used dynamically to generate a common key (object key Kobj) for encrypting and decrypting objects. While serving as the initial information for acquiring the object key Kobj, the content key Kc is not directly used to encrypt objects.

The key generation data is a value established individually for each object. The data may be set anew for each object, or may be derived from the object ID, object type or other data attached to the object in question. The same key generation data may be established for a plurality of objects. In this case, one object key Kobj need only be generated for the multiple objects.

Content is encrypted typically in five steps: (1) the range of objects to be encrypted is selected; (2) the number of encryption keys is selected; (3) a content key Kc is generated; (4) object keys Kobj are generated; and (5) each of the objects is encrypted. These steps are described below in more detail.

(1) Selecting the Range of Objects to be Encrypted

In the case of a book, for example, it may not be necessary to encrypt its covers and basic information about the publication. In that case, the text information mainly constituting the book is designated as the objects to be encrypted. This step is carried out by an authoring operator manipulating the encrypting apparatus 5 to select, from the candidate contents, those objects that need to be encrypted.

(2) Selecting the Number of Encryption Keys

Increasing the number of encryption keys (i.e., number of object keys Kobj) enhances the ability to conceal content but places more burdens on the reproducing apparatus 9 because of the increased number of keys to be generated by the apparatus 9 for reproduction. When the number of encryption keys (i.e., key multiplicity) is determined, a trade-off needs to be reached between the level of concealment desired by content distributors, service providers, and content authors on the one hand, and the resulting loads on the reproducing apparatus 9 on the other hand. Selection of the encryption key multiplicity is also performed by the authoring operator.

Where encryption keys are generated dynamically, a suitable unit needs to be provided to adjust their multiplicity.

Without such an unit, larger content sizes as they occur would entail a progressively larger encryption key count. The tendency would require the reproducing apparatus 9 to perform ever-more tasks in generating the encryption keys. It would also be more difficult to strike a balance between the performance of the reproducing apparatus 9 and the desired level of data concealment. This problem is solved by the content distribution system 1 with its ability to adjust encryption key multiplicity.

What follows is a description of some examples in which the number of encryption keys is selected.

(a) A different object key Kobj may be used for each object. This is a case in which the number of object keys Kobj is equal to the number of objects. The level of content data concealment is very high and the resulting load on the reproducing apparatus 9 is correspondingly heavy.

(b) A different object key Kobj may be used for each of the objects (e.g., pages of a book) that divide content of interest while an identical object key Kobj may be used for all other objects of the content. This is a case in which the number of object keys Kobj is the number of the divisions making up the content plus one. Here, too, the level of data concealment is high and the load incurred on the reproducing apparatus 9 is heavy.

(c) A different object key Kobj may be used for each object type. This is a case in which the number of object keys Kobj is equal to the number of object types. The level of content data concealment is at a medium degree and so is the load on the reproducing apparatus 9.

(d) The same object key Kobj may be used for all objects. In this case, the number of object key Kobj is one. The level of content data concealment is low and the load on the reproducing apparatus 9 is correspondingly light.

(e) Object keys Kobj may be established freely for objects. In this case, a desired object key Kobj may be set for each object free of restrictions that might be imposed by data specific to each object such as the object type. Here, the level of content data concealment and the magnitude of the load on the reproducing apparatus 9 are dependent on the number of object keys Kobj in use.

The authoring operator takes into account the circumstances described above before deciding on the multiplicity of encryption keys. The result of the decision is input to the encrypting apparatus 5 which in turn generates encryption keys. The encrypting apparatus 5 thus has an encryption key generating method setting unit. When the encryption key generating method is established, the reproducing apparatus 9 writes the method for the encryption keys of interest to a header part 55 (FIG. 4) of the encrypted content 6. Upon content utilization, the reproducing apparatus 9 reads the header part 55 to know the relevant encryption key generating method.

(3) Generating the Content Key Kc

The content key Kc serves as the initial data from which to generate object keys Kobj that are actually used to encrypt content. For that reason, the content key Kc should be varied from content to content and should be such that third parties have difficulty predicting what it is. With this embodiment, a random number generated by the encrypting apparatus 5 is used as the content key Kc.

(4) Generating the Object Keys Kobj

The encrypting apparatus 5 generates as many object keys Kobj as the number established in step (2) above for selecting the encryption key count. Illustratively, if a different object key Kobj is used for each object as in the case (a) above, the object ID of each object may be used as key generation data.

Here, the object key Kobj is generated by associating the content key Kc with the object ID using the following expression (1):

$$Kobj = F(Kc, \text{object ID}) \tag{1}$$

where, F stands for a function for calculating the object key Kobj. The other cases (b) through (e) above are also explained below as to how to generate the object keys Kobj.

In the case (b) above, Kobj=F (Kc, object ID) holds for at least one object found in each of the divisions that make up content; for the remaining objects, Kobj=F (Kc, fixed value) holds.

In the case (c) above, Kobj=F (Kc, object type) or Kobj=F (Kc, fixed value for each object type) holds.

In the case (d) above, Kobj=F (Kc, fixed value) holds.

In the case (e) above where the type of object key Kobj is to be varied freely for each object, key generation data is generated corresponding to the type of object key Kobj for a given object, and the key generation data thus generated is embedded in the object in question. Hence Kobj=F (Kc, embedded key generation data).

If the embedded key generation data is an individually different value for each object, a different object key Kobj is generated for each object. If the embedded key generation data is the same for all objects, the same object key Kobj is established for each object.

Where objects are divided into groups, the same key generation data may be established for the same group. That is, a different object key Kobj may be set for each of the groups involved.

As described, the encrypting apparatus 5 can encrypt content 4 using a different encryption key (object key Kobj) for each of the portions making up the content 4. Each of these portions corresponds to a single set of objects encrypted by the same object key Kobj.

The encrypting apparatus 5 is thus capable of generating object keys Kobj flexibly as discussed above for the objects involved. This feature is particularly advantageous for cases in which a plurality of publications are included in a single set of content. Typically, magazines (comics, weekly magazines, etc.) each involve a plurality of authors, and so do omnibus music albums. In multimedia content offerings, text data, still pictures and moving pictures coexist. In such cases, one set of content includes portions whose copyrights are owned by a plurality of authors.

These authors can modify their object keys Kobj individually. With such key modification accomplished, even if one author's portion of the content is illicitly decrypted, the modified keys can prevent the fraud from spreading to the works of the other authors.

It is also possible to change the multiplicity of the object keys Kobj per publication. Illustratively, content may include audio and video data, and it may be desired to boost the level of concealment for such and such data alone. In that case, the number of object keys Kobj may be increased for the portions to be better protected for secrecy.

Figure 3:
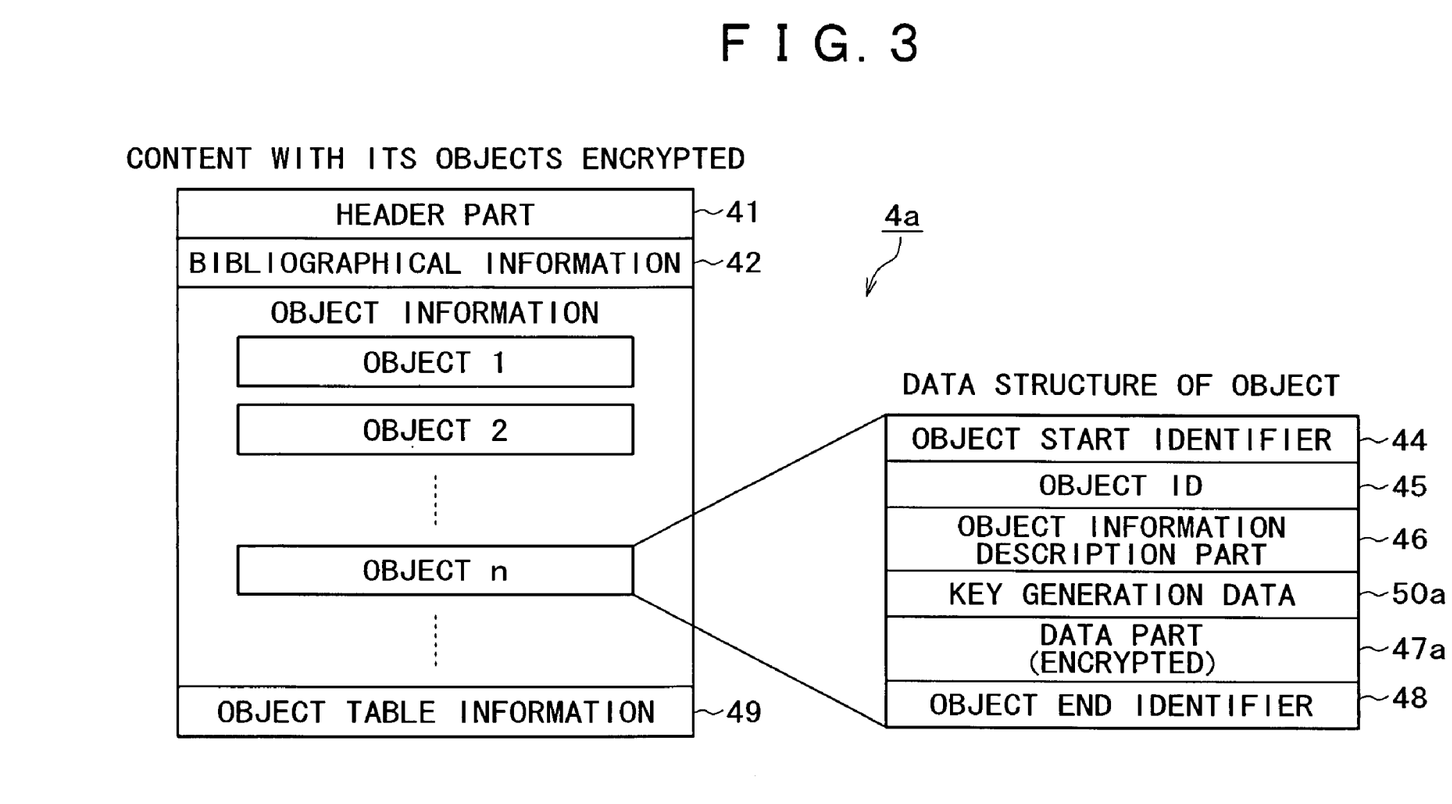
FIG. 3 is an explanatory view indicating a typical structure of content in effect after its objects have been encrypted.

FIG. 3 is an explanatory view indicating a typical structure of content 4*a* in effect after its objects have been encrypted by the encrypting apparatus 5. In FIG. 3, the data described in a data part 47*a* is encrypted using an object key Kobj. Key generation data 50*a* is provided as illustrated for embedding in an object. The key generation data 50*a* need not be embedded if the data is derived from an object ID, an object type, or other data attached beforehand to the object in question. After encrypting the object in this manner, the encrypting apparatus 5 (FIG. 1) proceeds to generate encrypted content 6.

Figure 4:
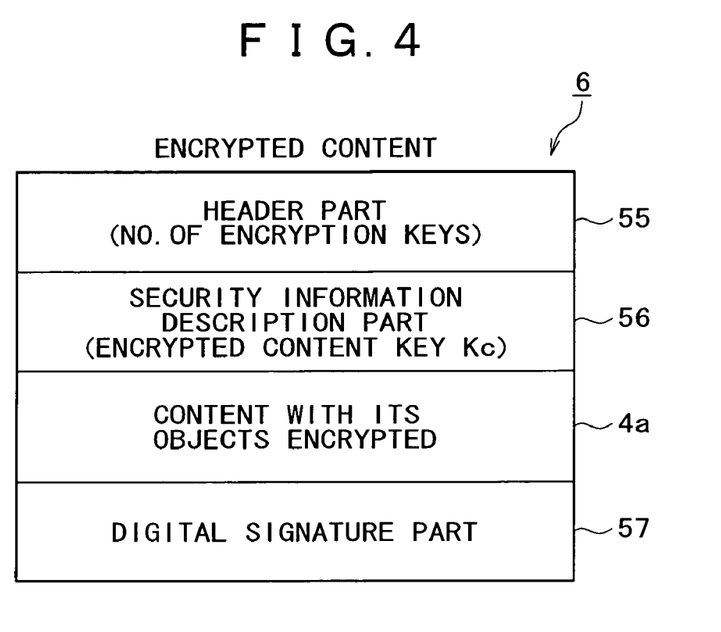
FIG. 4 is an explanatory view illustrating a typical structure of encrypted content.

FIG. 4 is an explanatory view illustrating a typical structure of the encrypted content 6. The encrypted content 6 is generated by adding a header part 55, a security information description part 56, and a digital signature part 57 to the content 4a with its objects encrypted.

In the header part 55, pieces of information dependent on the format of the encrypted content 6 are described. Also described in the header part 55 is an encryption key generating method for generating the object keys Kobj used to encrypt the objects. The encryption key generating method is used to select a calculation expression for generating the object keys Kobj. These pieces of information help enhance the level of security when they are encrypted in subsequently decryptable fashion using the license 12.

The header part 55 also includes license identification information for identifying the license 12. Using the license identification information, the reproducing apparatus 9 can download the license 12 from the license server 8.

If the number of encryption keys is determined in advance as part of the data format for content, the key count is unchangeable. In that case, it is impossible to control the level of security or the consequential decryption load on the reproducing apparatus 9 per publication. This embodiment, by contrast, enables the encryption key count (key multiplicity) to be established at a later stage in the header part 55 so that the level of security and the decryption load may be controlled as desired.

The security information description part 56 includes an encrypted content key Kc derived from the content key Kc as well as other information about security. The content key Kc is encrypted in a subsequently decryptable manner by use of the license, to be described later. That is, the content key Kc is encrypted by "a key for encrypting a key" before being embedded in the content. To acquire the "key for encrypting a key" requires the use of a file called a license (i.e., license 12).

When generating object keys Kobj, the reproducing apparatus 9 extracts the key generation data from each object based on the license information. For a group of objects that can be decrypted using the same object key Kobj, the initially decrypted object key Kobj for the first object can be reused for each of the remaining objects. In other words, there is no need to generate the same object key Kobj repeatedly for all objects in the same group.

The digital signature part 57 has digital signature information used to verify the validity of the encrypted content 6. Illustratively, the digital signature part 57 has a predetermined character string encrypted by use of a secret key owned by the license server 8. The encrypted character string is then decrypted by use of a public key delivered beforehand to the reproducing apparatus 9, so that the digital signature part 57 can be checked for validity.

The steps in which the encrypting apparatus 5 generates encrypted content 6 will now be described with reference to the flowchart of FIG. 5. These steps are carried out by the CPU (Central Processing Unit) of the encrypting apparatus 5 in accordance with a content encryption processing program.

Figure 5:
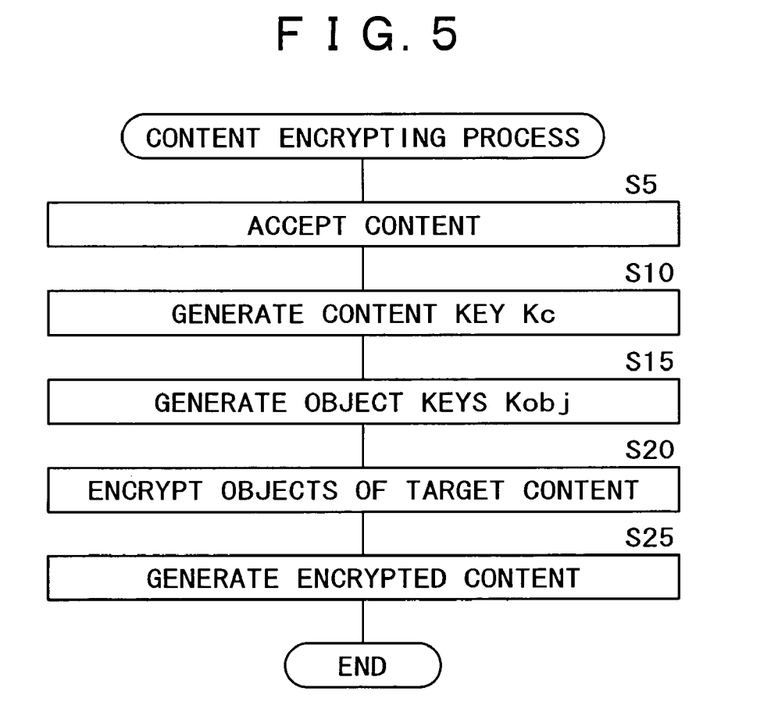
FIG. 5 is a flowchart of steps constituting a content encrypting process.

In step 5 of FIG. 5, the encrypting apparatus 5 accepts input of the content 4 created by the content creating apparatus 3. More specifically, the content 4 is acquired by a content acquiring unit of the encrypting apparatus 5. In step 10, the encrypting apparatus 5 generates a content key Kc illustratively by use of a random number.

In step S15, the encrypting apparatus 5 generates object keys Kobj by associating the key generation data for each object with the content key Kc generated in step 10. It is the operator who determines the multiplicity of object keys Kobj and the information to be used as key generation data (object ID, object type, or some other data set for and embedded in each object).

In step 20, the encrypting apparatus 5 encrypts each object using the object keys Kobj generated in step 15. Steps 10 to 20 are executed by a content encrypting unit that is part of the encrypting apparatus 5. After encryption of an object, the relevant key generation data may be embedded in the encrypted object where necessary.

In step 25, the encrypting apparatus 5 adds the header part 55, security information description part 56, and digital signature part 57 to the content 4a with its objects encrypted, thereby generating the encrypted content 6. At this point, the encrypting apparatus 5 encrypts the content key Kc in a manner subsequently decryptable by use of the license 12 and incorporates the encrypted content key Kc into the security information description part 56. These tasks are accomplished by an initial information processing unit of the encrypting apparatus 5. The encrypted content 6 thus generated is output by an outputting unit of the encrypting apparatus 5.

What follows is a description of the license 12. A license refers to rights data (i.e. license information) necessary for utilizing encrypted content. For example, a common key cannot be retrieved from encrypted content without a relevant license. With this embodiment, the license 12 is used to extract the content key Kc from the encrypted content 6.

Figure 6:
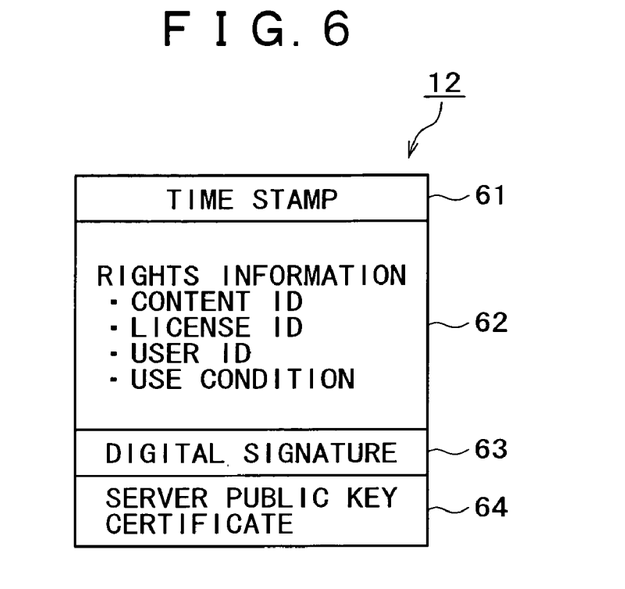
FIG. 6 is an explanatory view describing license information.

FIG. 6 is an explanatory view describing an example of the license 12. As illustrated, the license 12 is made up of a time stamp 61, rights information 62, a digital signature 63, and a server public key certificate 64. Upon use of the encrypted content 6, the license 12 is issued by the license server 8 and transmitted to the reproducing apparatus 9.

The time stamp 61 contains information for designating the time of day at which the license 12 was issued. This information is used illustratively to verify whether the clock of the client is accurate.

The rights information 62 includes copyrights-related information. Specifically, the rights information 62 is constituted by a content ID of the content relevant to this license 12, a license ID of the license 12, a user ID of the user who uses the license 12, and applicable use conditions such as an expiration date and an allowable print count.

The rights information 62 further includes information for extracting the content key Kc from the encrypted content 6. What is typically included is information for specifying the position in which the encrypted content key Kc is embedded in the encrypted content 6.

Alternatively, the reproducing apparatus 9 may be equipped with the ability to decrypt the content key Kc using the license 12 before extracting the key Kc from the encrypted content 6. In such a case, the reproducing apparatus 9 is illustratively in possession of an encryption key for decrypting the encrypted content key Kc. The reproducing apparatus 9 compares the rights information 62 with the header part 55 of the encrypted content 6 to determine whether a predetermined condition is met (i.e., coincidence of the content ID). If the condition is found to be met, the reproducing apparatus 9 extracts the content key Kc from the encrypted content 6.

The digital signature 63 is information for use in verifying the validity of the license 12. Illustratively, the digital signature 63 is generated by encrypting a predetermined character string with a secret key of the license server 8. Whether the license 12 is valid is determined by the reproducing apparatus 9 decrypting the digital signature 63 using a corresponding public key.

The server public key certificate 64 is information certifying that the public key signed in the digital signature 63 is valid. This certificate is issued illustratively by a third-party certification organization. Because the license 12 is provided with a certified digital signature, it can only be generated by the license server 8.

Figure 7:
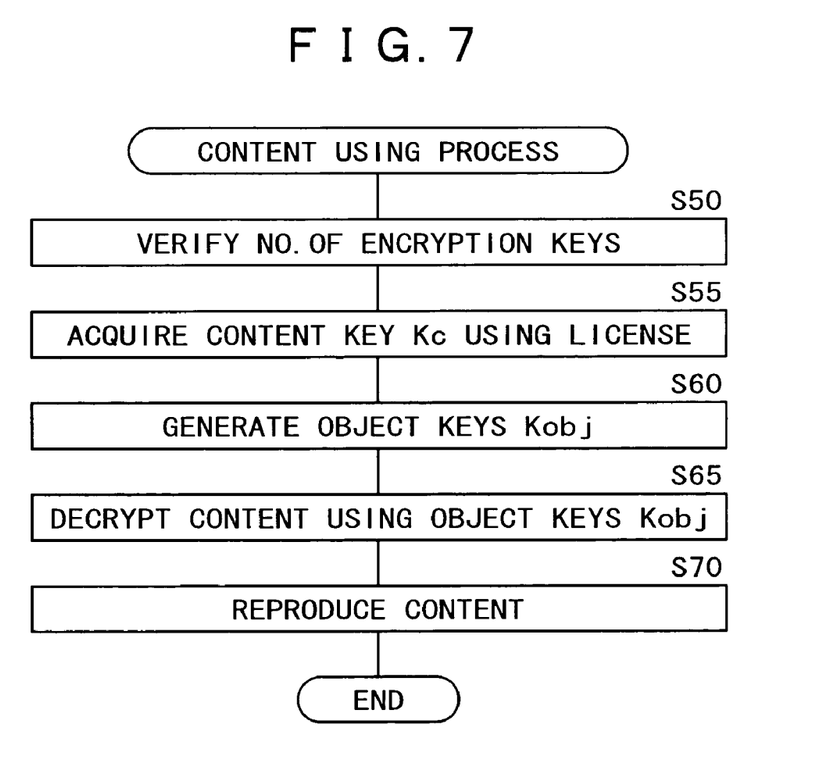
FIG. 7 is a flowchart of steps constituting a content reproducing process.

The steps in which the reproducing apparatus 9 reproduces content 4 will now be described with reference to the flowchart of FIG. 7. These steps are carried out by the CPU of the reproducing apparatus 9 in accordance with a content decryption program.

Following the successful authentication, the user downloads the encrypted content 6 from the content server 7, and downloads from the license server 8 the license 12 corresponding to the encrypted content 6. These tasks are achieved by a content acquiring unit and a license information acquiring unit of the reproducing apparatus 9.

When the user gives the reproducing apparatus 9 an instruction to use encrypted content 6, the decryption unit 15 (FIG. 1) in step 50 checks the header part 55 (FIG. 4) to determine the multiplicity of object keys Kobj (i.e., number of types of object keys Kobj). Specifically, this step is carried out by an encryption key generating method information verifying unit of the reproducing apparatus 9. Given the object key multiplicity, the decryption unit 15 selects an operating method (i.e., calculating method) for generating the object keys Kobj.

In step 55, the content key Kc is extracted from the encrypted content 6 by use of the license 12. This step is accomplished by an initial information acquiring unit of the reproducing apparatus 9.

In step 60, the decryption unit 15 acquires key generation data from each object, and operates on the acquired key generation data and on the content key Kc extracted in step S55 so as to generate the object keys Kobj.

In step 65, the decryption unit 15 decrypts each object using the object keys Kobj generated in step 60, thereby decrypting the content 4.

At the time of decryption, the decryption unit 15 may reduce the number of times step 60 is executed if the object key Kobj initially generated for the first of the object keys forming a group can be reused for the remaining objects within the same group. Steps 55 through 65 above are dealt with by a decrypting unit of the reproducing apparatus 9.

In step 70, the reproduction unit 16 reproduces the content 4 for use by the user. Specifically, this step is performed by a content reproducing unit of the reproducing apparatus 9. Illustratively, music content is output through speakers, and book content is displayed as characters and images on a display device.

Steps 55 through 65 above are processes that are highly confidential because they involve decryption. As such, these steps need to be carried out in a tamper-resistant environment such as a tamper-resistant chip so that the encryption keys and algorithms for generating these keys will not be stolen by illicit attempts.

Figure 8:
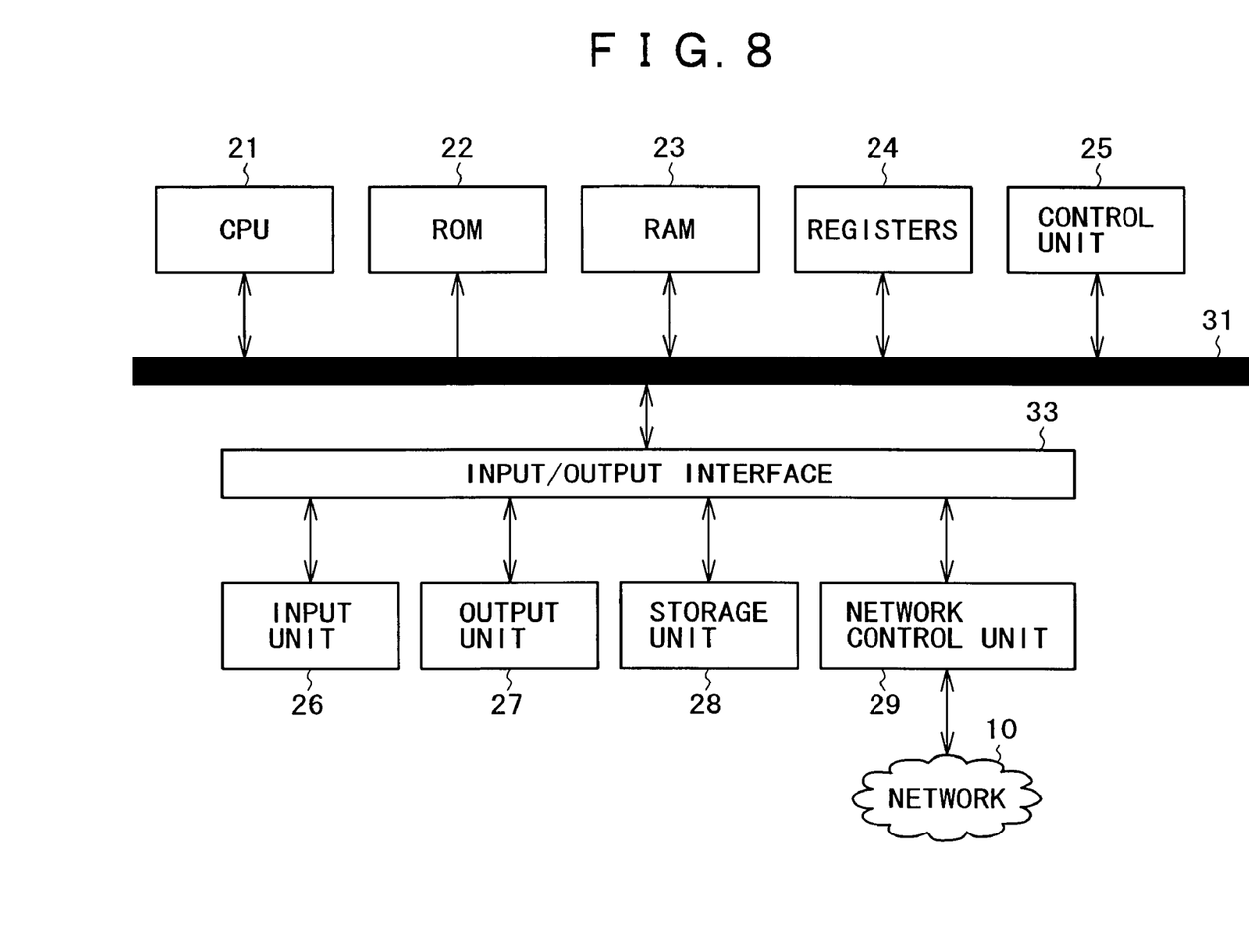
FIG. 8 is a block diagram showing a typical hardware structure of a reproducing apparatus.

A typical hardware structure of the reproducing apparatus 9 will now be described with reference to FIG. 8. As illustrated, the reproducing apparatus 9 has a CPU 21, a ROM 22, a RAM 23, registers 24, a control unit 25, and an input/output interface 33 interconnected via a bus line 31. The reproducing apparatus 9 may be formed illustratively by a personal computer, by a dedicated machine for content use, or by some appropriate portable apparatus.

The CPU 21 is a central processing unit that performs diverse processes in accordance with programs held in the ROM (Read-Only Memory) 22, RAM (Random Access Memory) 23, or a storage unit 28. By communicating with the content server 7 and license server 8, the CPU 21 downloads encrypted content 6 and licenses 12, decrypts content 4 from the encrypted content 6 using the licenses 12, and reproduces the decrypted content 4.

The ROM 22 is a read-only memory that holds basic programs and parameters necessary for causing the reproducing apparatus 9 to function. The RAM 23 is a random access memory to and from which data can be written and deleted. The RAM 23 provides a working memory for use in diverse processes such as decryption of the encrypted content 6 and reproduction of the content 4.

The registers 24 are memories for temporarily accommodating data with which the CPU 21 executes its processing at high speed. The control unit 25 operating under control of the CPU 21 handles secret information such as the content key Kc and object keys Kobj and carries out confidential processes such as decryption of the encrypted content 6. Because of these purposes for which it is intended, the control unit 25 is composed of a tamper-resistant chip or is otherwise structured to ensure its tamper-resistant capability.

More specifically, the control unit 25 constitutes a sort of computer that contains a CPU, a volatile memory and a non-volatile memory. These memories hold the content decryption program for decrypting the encrypted content 6. The CPU of the control unit 25 operates in collaboration with the CPU 21. The CPU decrypts the content 4 from the encrypted content 6 that has been input through the bus line 31, and outputs the decrypted content. The steps in which the content 4 is decrypted by the CPU constitute what may be termed a "black box" process.

The input/output interface 33 provides I/O interface functions between the reproducing apparatus 9 on the one hand, and peripheral devices such as an input unit 26, an output unit 27, a storage unit 28, and a network control unit 29 on the other hand. The input unit 26 is illustratively made up of a keyboard, a mouse, a joystick, and/or other suitable input device. The user operates these devices when inputting information to the reproducing apparatus 9.

The input unit 26 thus allows the user to input the URL (Uniform Resource Locator) of a content distribution site run by the content server 7 when connecting the reproducing apparatus 9 to the content server 7, enter information for identifying the content to be downloaded, and operate the reproduction unit 16 to control content reproduction.

The output unit 27 is made up of a display device, speakers, a printer, and/or other output device. The user makes use of content by recognizing the information output by these output devices. For example, book content, still picture content, and moving picture content are reproduced as characters, still pictures, and moving pictures respectively on the display device; some of the content items may also be output on the printer. Music content is reproduced as pieces of music that are output through the speakers.

The storage unit 28 is a mass storage device such as a hard disk drive to and from which data is written and read by the CPU 21. Instead of being composed of hard disks, the storage unit 28 may alternatively have a magneto-optical disk, a magnetic disk, a semiconductor memory, or some other suitable storage medium furnished in combination with a corresponding storage medium drive.

The storage unit 28 holds an OS (Operating System) that allows the reproducing apparatus 9 to implement basic functions such as file input and output. The storage unit 28 also retains diverse programs including communication programs for communicating with the content server 7 and license server 8 to download encrypted content 6 and licenses 12 therefrom, along with a content reproduction program for reproducing content 4. Furthermore, the storage unit 28 accommodates the encrypted content 6 and licenses 12 which are downloaded from the content server 7 and license server 8 respectively by the reproducing apparatus 9. When the content 4 is decrypted, the decrypted content is also stored into the storage unit 28.

The network control unit 29 is constituted illustratively by a communication control device such as a modem. The network control unit 29 connects the reproducing apparatus 9 to the network 10 to control communications over the network 10. The reproducing apparatus 9 communicates with the content server 7 and license server 8 through the network control unit 29. If the reproducing apparatus 9 is formed by a portable device, the network control unit 29 may be structured as a wireless sender/receiver apparatus for communicating with a base station which, connected to the network 10, in turn communicates with the content server 7 and license server 8.

Although not shown, the bus line 31 is further connected to a storage medium drive that may have a semiconductor memory, a magneto-optical disk, a magnetic disk, or other storage medium loaded therein in detachable fashion. The CPU 21 can write and read data to and from the loaded storage medium through the storage medium drive. It is also possible to distribute the content 4 and licenses 12 to the reproducing apparatus 9 through the use of any one of such storage media.

The typical structure of the reproducing apparatus 9 has been described above. The hardware structure of the content creating apparatus 3, encrypting apparatus 5, content server 7, and license server 8 is basically the same as the hardware structure of the reproducing apparatus 9. The content creating apparatus 3 implements its content creating function by executing a content creation program that is retained in the apparatus 3. The encrypting apparatus 5 retains a content encryption program and carries out the program to implement various functions such as generating the content key Kc, generating the object keys Kobj, encrypting objects, and generating a digital signature.

The content server 7 holds a content distribution program in addition to the encrypted content 6, and implements its content offering function by carrying out the content distribution program. The license server 12 implements its license offering function by executing a license generation program that is retained inside.

The preferred embodiment of this invention practiced as described above offers the following major advantages:

(1) By changing the encryption key (object key Kobj) from one object to another, the embodiment makes it difficult for a third party to identify the encryption keys and thereby to prevent illicit decryption and boost the level of data concealment.

(2) When the embodiment generates encryption keys dynamically, their size remains unchanged even if the content to be encrypted is large in quantity.

(3) The multiplicity of encryption keys can be determined for each set of content. Fewer encryption keys alleviate the burdens on the client when generating the keys, and more encryption keys enhance the level of data security. This allows the user to decide on an optimum trade-off between the increased level of data concealment and the reduced processing load on the client during reproduction.

(4) Because the multiplicity of encryption keys can be established for each batch of content, it is possible to control the level of security and the degree of reproducing load from content to content.

(5) A plurality of authors may create a plurality of sets of publication data constituting a single entity such as a book. In such cases, the encryption keys applicable to any one author's content may be modified independently of the other authors, so that the target data to be concealed and the increments of the encryption keys for the data are made consistent for the author in question. This means that even if one author's content is illicitly decrypted, the propagation of the fraudulent practice to the other authors' works is made extremely unlikely.

(6) For the content made of data created by a plurality of authors, it is possible to increase encryption keys only for the data portion whose security is desired to be specifically boosted.

(7) The invention is easy to apply to copyright protection techniques that are becoming increasingly important today. The invention can be practiced advantageously in implementing encryption processes that make effective use of the characteristics of particular content formats adopted by electronic books and other diverse kinds of content.

The content distribution system above was shown adopting the so-called superdistribution system whereby content and a license necessary for decrypting that content may be distributed separately. However this is not limitative of the invention. Alternatively, the invention may be applied to other types of systems. Illustratively, the information needed to decrypt content may be embedded beforehand in a tamper-resistant chip of the reproducing apparatus. This arrangement provides for a license-free system.

As many apparently different embodiments of this invention may be made without departing from the spirit and scope thereof, it is to be understood that the invention is not limited to the specific embodiments thereof except as defined in the appended claims.

What is claimed is:

1. A content distributing system for distributing content, comprising:

an encrypting apparatus including a hardware processor configured to receive an encryption selection and to encrypt a plurality of objects constituting content by
generating a content key for all of the plurality of objects,
determining an amount of object keys based on the encryption selection, the encryption selection including
encrypting based on an object ID of each object,
encrypting based on an object ID of a portion of objects and based on a fixed value for remaining objects,
encrypting based on an object type,
encrypting based on a fixed value, and
encrypting based on embedded key generation data,
generating, by a processor, a plurality of object keys for each of the objects based on the content key and key generation data, the key generation data including different types of data from a respective object for which the object key is generated, the type of key generation data used when generating the plurality of object keys being based on the amount of object keys, the content representing at least one of a book and a magazine, each of the objects representing a page of the at least one of the book and the magazine, and
encrypting content data of the plurality of objects with a respective object key to generate encrypted content;

a content offering apparatus including a hardware processor configured to offer the encrypted content to a content reproducing apparatus;

a license information offering apparatus including a hardware processor configured to offer license information having information necessary to decrypt said encrypted content; and a content reproducing apparatus including a hardware processor configured to
- acquire said encrypted content from said content offering apparatus, and
- to decrypt and reproduce the acquired content via said license information acquired from said license offering apparatus.

2. An encrypting apparatus comprising:

a hardware processor configured to receive an encryption selection and to execute
- a content acquiring software component, of the encrypting apparatus, to acquire content;
- an encrypting software component, of the encrypting apparatus, to encrypt the acquired content as a plurality of objects constituting the acquired content by
  - generating a content key for all of the plurality of objects,
  - determining an amount of object keys based on the encryption selection, the encryption selection including
    - encrypting based on an object ID of each object,
    - encrypting based on an object ID of a portion of objects and based on a fixed value for remaining objects,
    - encrypting based on an object type,
    - encrypting based on a fixed value, and
    - encrypting based on embedded key generation data,
  - generating, by a processor, a plurality of object keys for each of the objects based on the content key and key generation data, the key generation data including different types of data from a respective object for which the object key is generated, the type of key generation data used when generating the plurality of object keys being based on the amount of object keys, the content representing at least one of a book and a magazine, and each of the objects representing a page of the at least one of the book and the magazine, and
  - encrypting content data of the plurality of objects with a respective object key to generate encrypted content; and
- an outputting software component of the encrypting apparatus, to output the encrypted content.

3. The encrypting apparatus according to claim 2, further comprising:

an establishing software component executed by the hardware processor to establish an encryption key generating method to determine a number of object keys in a case where a number of object keys differs from a number of objects.

4. The encrypting apparatus according to claim 2, wherein said encrypting software component incorporates encryption key generating method information representing an encryption key generating method into said encrypted content.

5. The encrypting apparatus according to claim 2, further comprising:

a license information offering apparatus including a hardware processor configured to generate licensing information that is added to the encrypted content by encrypting the content key based on a license file.

6. The encrypting apparatus according to claim 2, wherein the encrypting unit adds the encryption key generating method to a header part of the encrypted content.

7. The content distributing system according to claim 1, wherein the license information offering apparatus generates the licensing information by encrypting the content key based on a license file.

8. The content distributing system according to claim 1, wherein the encrypting apparatus adds the encryption key generating method to a header part of the encrypted content.

9. The content distributing system according to claim 1, wherein the content contains bibliographical information and information of the plurality of objects.

10. The content distributing system according to claim 9, wherein the information of the plurality of objects includes a data section and object information section, the object information section describing a type of object based on data stored in the data section.

11. An content reproducing apparatus comprising:

a hardware processor configured to receive an encryption selection and to execute
- a content acquiring software component, of the content reproducing apparatus, to acquire content having a plurality of objects encrypted by
  - generating a content key for all of the plurality of objects,
  - determining an amount of object keys based on the encryption selection, the encryption selection including
    - encrypting based on an object ID of each object,
    - encrypting based on an object ID of a portion of objects and based on a fixed value for remaining objects,
    - encrypting based on an object type,
    - encrypting based on a fixed value, and
    - encrypting based on embedded key generation data,
  - generating, by a processor, a plurality of object keys for each of the objects based on the content key and key generation data, the key generation data including different types of data from a respective object for which the object key is generated, the type of key generation data used when generating the plurality of object keys being based on the amount of object keys, the content representing at least one of a book and a magazine, and each of the objects representing a page of the at least one of the book and the magazine, and
  - encrypting content data of the plurality of objects with a respective object key to generate encrypted content;
- a decrypting software component, of the content reproducing apparatus, to decrypt said objects constituting said content; and
- a content reproducing software component, of the content reproducing apparatus, to reproduce the decrypted content.

12. The content reproducing apparatus according to claim 11, further comprising:

a license information acquiring software component executed by the hardware processor to acquire license information corresponding to the acquired content; and a content key acquiring software component executed by the hardware processor to acquire said content key from said content by decrypting said content key using the acquired license information;

wherein said decrypting unit generates said plurality of object keys using the content key.

13. The content reproducing apparatus according to claim 11, further comprising:

an encryption key generating method information verifying software component executed by the hardware processor to verify an encryption key generating method information acquired from the acquired content and which represents an encryption key generating method for generating said plurality of object keys;

wherein said decrypting unit selects an operating method for generating said plurality of object keys via the verified encryption key generating method information.

14. An encrypting method, implemented by an encrypting apparatus, for use with a computer having a content acquiring unit, an encrypting unit, and an outputting unit, said encrypting method comprising:

acquiring an encryption selection;

acquiring, by the encrypting apparatus, content having a plurality of objects by the acquiring unit;

generating, by the encrypting apparatus, a content key for all of the plurality of objects by the encrypting unit;

determining an amount of object keys based on the encryption selection, the encryption selection including
encrypting based on an object ID of each object,
encrypting based on an object ID of a portion of objects and based on a fixed value for remaining objects,
encrypting based on an object type,
encrypting based on a fixed value, and
encrypting based on embedded key generation data, generating, by the encrypting apparatus and via a processor, a plurality of object keys for each of the objects of the content based on the content key and key generation data, the key generation data including different types of data from a respective object for which the object key is generated with the encrypting unit, the type of key generation data used when generating the plurality of object keys being based on the amount of object keys, the content representing at least one of a book and a magazine, and each of the objects representing a page of the at least one of the book and the magazine;

encrypting, by the encrypting apparatus, content data of the plurality of objects with a respective object key to generate encrypted content with the encrypting unit; and outputting, by the encrypting apparatus, the encrypted content via the outputting unit.

15. The encrypting method according to claim 14, wherein said computer further comprises a content key processing unit, and said encrypting method further comprises:
causing said content key processing unit to encrypt said content key in a manner decryptable by use of license information, and
incorporating the encrypted content key into said encrypted content.

16. The encrypting method according to claim 14, wherein said computer further comprises an encryption key generating method establishing unit, and said encrypting method further comprises:
causing said encryption key generating method establishing unit to establish an encryption key generating method.

17. The encrypting method according to claim 14, wherein the encrypting step incorporates encryption key generating method information representing an encryption key generating method into said encrypted content.

18. The encryption method according to claim 14, further comprising the step of:
generating licensing information by encrypting the content key based on a license file by a license information offering unit.

19. The encryption method according to claim 14, further comprising the step of:
adding the encryption key generating method to a header part of the encrypted content by the encrypting unit.

20. A non-transitory computer readable storage medium which stores an information processing program, which when executed by a computer causes the computer to perform a method comprising:

acquiring an encryption selection;
acquiring content having a plurality of objects;
generating a content key for all of the plurality of objects;
determining an amount of object keys based on the encryption selection, the encryption selection including
encrypting based on an object ID of each object,
encrypting based on an object ID of a portion of objects and based on a fixed value for remaining objects,
encrypting based on an object type,
encrypting based on a fixed value, and
encrypting based on embedded key generation data, generating a plurality of object keys for each of the objects of the content based on the content key and key generation data, the key generation data including different types of data from a respective object for which the object key is generated, the type of key generation data used when generating the plurality of object keys being based on the amount of object keys, the content representing at least one of a book and a magazine, and each of the objects representing a page of the at least one of the book and the magazine;

encrypting content data of the plurality of objects with a respective object key to generate encrypted content; and
outputting the encrypted content.

21. The non-transitory computer readable storage medium according to claim 20, further comprising:
establishing an encryption key generating method,
wherein an encryption key generating function generates said plurality of object keys by use of the established encryption key generating method.

22. The non-transitory computer readable storage medium according to claim 20, wherein the encrypting function incorporates encryption key generating method information representing the encryption key generating method into said encrypted content.

23. The non-transitory computer readable storage medium according to claim 20, said method further comprising the step of:
generating licensing information by encrypting the content key based on a license file by a license information offering unit.

24. The non-transitory computer readable storage medium according to claim 20, said method further comprising the step of:
adding the encryption key generating method to a header part of the encrypted content by the encrypting unit.

25. A non-transitory computer readable storage medium which stores an information processing program, which when executed by a computer causes the computer to perform a method comprising:

acquiring an encryption selection;
accepting a request for offering of content, the content including a plurality of objects encrypted by
using a content key for all of the plurality of objects,
determining an amount of object keys based on the encryption selection, the encryption selection including
encrypting based on an object ID of each object,
encrypting based on an object ID of a portion of objects and based on a fixed value for remaining objects,
encrypting based on an object type,
encrypting based on a fixed value, and
encrypting based on embedded key generation data,
generating a plurality of object keys for each of the objects based on the content key and based on data, the key generation data including different types of data from a respective object for which the object key is generated, a type of key generation data used when generating the plurality of object keys being based on the amount of object keys, the content representing at least one of a book and a magazine, and each of the objects representing a page of the at least one of the book and the magazine, and
encrypting content data of the plurality of objects with a respective object key to generate encrypted content; and
offering said content in response to the accepted request.

26. The non-transitory computer readable storage medium according to claim 25, wherein said content includes encryption key generating method information representing an encryption key generating method for generating the plurality of object keys.

27. A non-transitory computer readable storage medium which stores an information processing program, which when executed by a computer causes the computer to perform a method comprising:
acquiring an encryption selection;
acquiring content, the content including a plurality of objects encrypted by
using a content key for all of the plurality of objects,
determining an amount of object keys based on the encryption selection, the encryption selection including
encrypting based on an object ID of each object,
encrypting based on an object ID of a portion of objects and based on a fixed value for remaining objects,
encrypting based on an object type,
encrypting based on a fixed value, and
encrypting based on embedded key generation data,
generating a plurality of object keys for each of the objects based on the content key and key generation data, they key generation data including different types of data from a respective object for which the object key is generated, the type of key generation data used when generating the plurality of object keys being based on the amount of object keys, the content representing at least one of a book and a magazine, and each of the objects representing a page of the at least one of the book and the magazine, and
encrypting content data of the plurality of objects with a respective object key to generate encrypted content;
decrypting said objects constituting said content; and
reproducing the decrypted content.

28. The non-transitory computer readable storage medium according to claim 27, wherein said content key is in said content in encrypted form,
wherein said non-transitory computer readable storage medium further comprises:
acquiring license information corresponding to the acquired content; and
acquiring said content key from said content by decrypting said content key using the acquired license information, and
wherein the decrypting function generates said plurality of object keys using the acquired content key.

29. The non-transitory computer readable storage medium according to claim 27, further comprising:
verifying the encryption key generating method information which is acquired from the acquired content and which represents the encryption key generating method for generating said plurality of object keys;
wherein the decrypting function selects an operating method for generating said plurality of object keys by use of the verified encryption key generating method information.

* * * * *